3,199,990
FUNGUS RESISTANT PAINTS
Wilbur S. Taylor, Norwalk, Conn., assignor to R. T. Vanderbilt Company, Inc., New York, N.Y., a corporation of New York
No Drawing. Filed Oct. 19, 1961, Ser. No. 146,339
5 Claims. (Cl. 106—15)

The present invention pertains to paints, and more particularly to fungus resistant paints.

Paints used to provide protective coatings to surfaces, such as wood and metal, are frequently subject to attack by fungus, particularly under the hot and humid conditions encountered in the tropics. In order to protect such coatings from fungal attack, various fungicides have been incorporated into paints. The heretofore known paints containing fungicides, however, have only been partially satisfactory for a variety of reasons.

Many fungicides, for example, lose their fungicidal activity when incorporated into paints, or they are too toxic for human safety. Typical of such fungicides are the organic mercurial compounds, such as phenylmercuric phthalate, p-acetylaminophenlymercuric acetate, pyridylmercuric chloride, phenylmercuric acetate, phenylmercuric chloride and phenylmercuric salicylate. Some fungicides impart undesirable color to paints. They are, therefore, restricted to use in dark colored paints where the discoloration can be masked and they cannot be used in white or tinted paints. Typical of such fungicides is cuprous oxide. Other fungicides interfere with the drying of paints or impart a noxious odor to paints. 2-mercaptobenzothiazole, zinc dimethyl dithiocarbamate and N-trichloromethyl-mercapto-4-cyclohexene-1,2-dicarboximide are examples of such fungicides. Still other fungicides are quite volatile and have an irritating odor, for example formaldehyde, so that they are also unsuitable for use in paints. While some fungicides can be used in organic solvent thinned paints, they cannot be used in water thinned paints because they are unstable therein. Typical of such fungicides is N-trichloromethyl-mercapto-4-cyclohexene-1,2-dicarboximide.

It is, therefore, quite apparent that the preparation of a satisfactory fungus resistant paint is not a simple matter of merely incorporating a fungicide therein. The finding that a compound has fungicidal properties in no way enables a paint chemist to foretell its behavior and suitability in paints as illustrated by the above examples of numerous unsatisfactory fungicides.

It is, therefore, an object of the present invention to provide paints, which on application to a surface will form a protective coating that is resistant to damage by fungi. A further object is to provide fungus resistant paints wherein the fungicide will not lose its fungicidal activity when incorporated into paints and on storage thereof. An additional object is to provide paints which contain a fungicide and yet which are not too toxic for human safety. A further object is to provide fungus resistant paints which can range in color from white through tinted to dark colors. Another object of the invention is to provide fungus resistant paints having adequate drying characteristics and free of noxious odors. A still further object is to provide organic solvent thinned paints and/or water thinned paints which will be resistant to mold or fungal attack.

In view of the above discussion it has now been found quite unexpectedly that organic solvent thinned paints and/or water thinned paints satisfying the above objects can be prepared, provided there is incorporated therein a specific fungicide, namely trans-1,2-bis(n-propylsulfonyl) ethylene having the following structural formula:

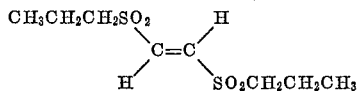

This known material is a white, crystalline powder having a melting range of 153° C.–154° C. This fungicide can be prepared by reacting 1,2-dichloroethylene with n-propylmercaptan in the presence of potassium hydroxide to yield 1,2-bis(n-propylmercapto) ethylene, which upon treatment with an oxidizing agent, such as hydrogen peroxide, yields 1,2-bis(n-propylsulfonyl) ethylene. The resulting product is a mixture of cis and trans isomers. The trans isomer can be separated from the isomeric mixture by crystallization from aqueous ethanol.

The trans-1,2-bis(n-propylsulfonyl) ethylene is present in the paint in an amount from about 0.2% to about 2.5% by weight of the paint. It is preferred to use an amount of the fungicide based on the weight of the paint in the range from about 0.3% to about 2%. A more preferred range of the fungicide is from about 0.5% to about 1% based on the weight of the paint. The fungicide is incorporated into the paints in the conventional manner, such as by milling or by solution in the paint vehicle.

It is remarkable that the nature of the paint to which the fungicide of the invention is added is in no way critical, it having been found that the trans-1,2-bis(n-propylsulfonyl) ethylene is compatible with organic solvent thinned paints and/or water thinned paints. Thus, the paints of the invention contain the usual amounts of any conventional film-forming base or non-volatile vehicle, typical examples of which include drying or semi-drying oils, such as linseed oil, dehydrated castor oil, soya bean oil, oiticica oil, etc.; esters of the acids derived from the drying or semi-drying oils and polyhydric alcohols, such as glycerol, ethylene glycol, sorbitol, etc.; the pure esters of the drying or semi-drying oil fatty acids, such as linoleic acid, oleic acid, etc., and polyhydric alcohols, such as ethylene glycol, glycerol, mannitol, etc.; drying or semi-drying oil modified resins, such as the modified alkyd resins prepared, for example, by the esterification of glycerol, phthalic anhydride and the drying or semi-drying oil fatty acids; the modified phenolic resins prepared, for example, by the reaction of cresols, formaldehyde and the drying or semi-drying oils; the modified esters of rosin or modified rosins prepared, for example, by the esterification of rosin, glycerol or pentaerythritol and the drying or semi-drying oil fatty acids; synthetic rubber latex emulsions, such as butadiene-styrene copolymers; vinyl polymers, such as homopolymeric polyvinyl acetate and vinyl acetate copolymerized with other vinyl monomers; acrylic resins; polyurethanes; epoxies; and other conventional film-forming bases.

The antifungal paints will also contain conventional amounts of pigments, which term as used herein includes extenders, fillers and thickeners, such as titanium dioxide, carbon black, calcium carbonate, wood flour, clay, diatomaceous earth, bentonite, zinc oxide, magnesium silicate, lithopone, mica, mineral or chemical pigment colors, etc. The antifungal paints will also contain the usual amounts of conventional volatile liquids used as thinners or solvents, such as toluene, xylol, turpentine, mineral spirits, water, etc. If desired, small amounts of plasticizers, such as tricresyl phosphate; metallic driers, such as the metal salts of carboxylic acids, e.g., acetates, tallates, napthhenates, oleates, linoleates, octoates and resinates of manganese, zinc, lead, cobalt, calcium and iron; also other additives, e.g. wetting agents, emulsifying agents, antifoaming agents, coalescing agents, freeze-thaw stabilizers, and the like, may be incorporated in the antifungal paints.

The fungus resistant paints of the invention will be illustrated by the following examples. The paints in the following examples were rated for their resistance to mold growth or fungal attack on the following scale.

| Rating: | Mold growth |
|---|---|
| 10 | None. |
| 8 | Slight. |
| 6 | Considerable. |
| 4 | Heavy. |
| 2 | Very heavy. |
| 0 | Extreme. |

EXAMPLES 1–4

An organic solvent thinned house paint was prepared by blending together the following ingredients in the amounts indicated.

| Ingredients | Amount in— | |
|---|---|---|
| | Pounds | Gallons |
| Titanium Dioxide (anatase) | 100 | 3.1 |
| Titanium Dioxide (rutile) | 100 | 2.9 |
| Zinc Oxide | 100 | 2.1 |
| Magnesium Silicate | 440 | 18.5 |
| Linseed Oil (raw) | 340 | 43.8 |
| Linseed Oil (Alinco X) | 100 | 12.5 |
| Lead Tallate (24% lead metal) | 12 | 1.2 |
| Manganese Tallate (6% manganese metal) | 2 | 0.3 |
| Mineral Spirits | 102 | 15.6 |
| Totals | 1,296 | 100.0 |

A sample of this paint was retained as a control. To three other samples thereof there were added respectively 0.5%, 1% and 2% of the paint, of trans-1,2-bis(n-propylsulfonyl) ethylene. Separate wooden panels were coated with these samples of the paint and the first coat allowed to air dry for two days. A second coat was then applied and allowed to air dry for three days. A third coat was then applied and allowed to air dry for two weeks. The coated wooden panels were then exposed outdoors at 20° from the horizontal facing south and examined periodically for mold growth. The results of this outdoor test are set forth below in Table I.

*Table I*

| Example | Trans-1,2-bis(n-propylsulfonyl) ethylene, percent by Weight of Paint | Mold Growth Rating After Exposure in Weeks | | |
|---|---|---|---|---|
| | | 20 | 26 | 67 |
| 1 | None—Control | 7 | 5 | 3 |
| 2 | 0.5 | 10 | 7 | 5 |
| 3 | 1.0 | 10 | 10 | 9 |
| 4 | 2.0 | 10 | 10 | 10 |

In the eight examples set forth below the paints were tested in a tropical cabinet in order to determine their performance under tropical conditions. This test in effect is an accelerated mold growth test.

EXAMPLES 5–8

A water-thinned paint was prepared by blending together the following ingredients.

ALKYD EMULSION

| Ingredients: | Pounds in 100 gallons |
|---|---|
| Aroplaz 1274 (phthalic alkyd resin, long oil, soya-tung, 100% non-volatile) | 34.50 |
| Activ-8 (38% 1,10-phenanthroline) | 0.12 |
| Cobalt naphthenate (6% cobalt metal) | 1.00 |
| Ammonium hydroxide (28%) | 1.50 |
| Triton X-100 (iso-octyl phenoxy polyethoxy ethanol) | 3.50 |
| Cascoloid ST-227 (18% casein dispersion in water, pH 8.5) | 83.00 |
| Water | 58.50 |

PIGMENT DISPERSION

| Ingredients: | |
|---|---|
| Water | 50.00 |
| Tetrapotassium pyrophosphate (10% aqueous solution) | 12.00 |
| Titanium dioxide (rutile) | 250.00 |
| Lithopone | 100.00 |
| Mica (325 mesh) | 43.00 |

REDUCTION

| Ingredients: | |
|---|---|
| Water | 206.00 |
| Nopco 1407 (a 40% active aqueous solution of an antifoamant) | 4.50 |
| Dow Latex 762–W (styrene-butadiene emulsion, 48% non-volatile, 67% styrene content) | 287.00 |
| Total | 1134.62 |

A sample of this paint was retained as a control. To three further samples thereof there were added respectively 0.3%, 0.6% and 1%, by weight of the paint, of trans-1,2-bis(n-propylsulfonyl) ethylene.

The paint samples were applied to 4" x 8" plate glass panels using an applicator blade which delivered a wet-film thickness of 3.3 mils. These films were allowed to air dry for a period of five days and were then exposed vertically in a tropical cabinet maintained at 90° F. and 95+% relative humidity. The cabinet was heavily inoculated with a suspension of *Aspergillus niger, Aspergillus oryzae*, Trichoderma T-1 and *Penicillium citrinum*. At weekly intervals the paint films were observed and rated for mold growth using the above mold growth scale.

Four additional samples of these paints were stored in cans for two months in order to determine their performance after storage and were then tested by the above procedure.

*Table II*

| Example | Trans-1,2-bis(n-propylsulfonyl) ethylene, Percent by Weight of Paint | Mold Growth Rating After Exposure in Weeks | | | | | | | |
|---|---|---|---|---|---|---|---|---|---|
| | | Freshly Prepared | | | | Stored Two Months | | | |
| | | 1 | 2 | 3 | 4 | 1 | 2 | 3 | 4 |
| 5 | None—Control | 5 | 5 | 5 | 5 | 8 | 6 | 5 | 5 |
| 6 | 0.3 | 10 | 10 | 10 | 10 | 10 | 10 | 10 | 10 |
| 7 | 0.6 | 10 | 10 | 10 | 10 | 10 | 10 | 10 | 10 |
| 8 | 1.0 | 10 | 10 | 10 | 10 | 10 | 10 | 10 | 10 |

EXAMPLES 9-12

An organic solvent thinned paint was prepared by blending together the following ingredients:

| Ingredients | Pounds | Gallons |
|---|---|---|
| Titanium Dioxide (anatase) | 250 | 7.7 |
| Magnesium Silicate | 450 | 19.0 |
| Raw Linseed Oil | 440 | 56.6 |
| Lead Tallate (24% lead metal) | 12 | 1.2 |
| Manganese Tallate (6% manganese metal) | 2 | 0.3 |
| Mineral Spirits | 100 | 15.2 |
| Totals | 1,254 | 100.0 |

A sample of this paint was retained as a control. To three other samples thereof there was added respectively 0.3%, 0.5% and 1%, by weight of the paint, of trans-1,2-bis(n-propylsulfonyl) ethylene.

These samples of paint were applied to 4" x 8" plate glass panels using an applicator blade which delivered a wet film thickness of 3.3 mils. These films were allowed to air dry for a period of five days and were then exposed vertically in a tropical cabinet maintained at 90° F. at 95+% relative humidity. The cabinet was heavily inoculated with a suspension of *Aspergillus niger*, *Aspergillus oryzae*, *Trichoderma T-1* and *Penicillium citrinum*. At weekly intervals the paint films were observed and rated for mold growth in accordance with the above mold growth scale.

Four additional samples of these paints were stored in cans for two months in order to determine their performance after storage and were then tested by the above procedure.

*Table III*

| Example | Trans-1,2-bis(n-propyl-sulfonyl)ethylene, Percent by Weight of Paint | Mold Growth Rating After Exposure in Weeks | | | | | | | |
|---|---|---|---|---|---|---|---|---|---|
| | | Freshly Prepared | | | | Stored Two Months | | | |
| | | 1 | 2 | 3 | 4 | 1 | 2 | 3 | 4 |
| 9 | None—Control | 8 | 4 | 3 | 2 | 8 | 6 | 3 | 2 |
| 10 | 0.3 | 10 | 10 | 9 | 7 | 10 | 10 | 9 | 9 |
| 11 | 0.5 | 10 | 10 | 10 | 10 | 10 | 10 | 10 | 10 |
| 12 | 1.0 | 10 | 10 | 10 | 10 | 10 | 10 | 10 | 10 |

The above illustrative examples clearly demonstrate that the paints of the invention are remarkably effective in preventing fungal attack on the protective coatings formed from the paints; that the paints retain their fungicidal activity even after storage; and that the paints can be not only organic solvent thinned paints but also water thinned paints. The fungicide incorporated into these paints did not impart any undesirable color to the paints, nor any noxious odor, nor did it affect the drying properties thereof. It will, therefore, be seen that the paints of the invention possess all of those desirable characteristics of a fungus resistant paint so long sought after by the paint industry.

It was also found that trans-1,2-bis(n-propylsulfonyl) ethylene performs quite satisfactorily in protecting against fungal attack on the organic plasticizer components present in vinyl resin objects without interfering with the necessary performance characteristics of vinyl resin formulations during processing and use.

It will be appreciated that various modifications and changes can be made in the paints of the invention without departing from the spirit thereof, and accordingly the invention is to be limited only within the scope of the appended claims.

What is claimed is:

1. A fungus resistant paint comprising pigment, film-forming base, volatile solvent and from about 0.2% to about 2.5%, by weight of the paint, of trans-1,2-bis(n-propylsulfonyl) ethylene.

2. A fungus resistant paint as set forth in claim 1 wherein the volatile solvent is a volatile organic solvent.

3. A fungus resistant paint as set forth in claim 1 wherein the volatile solvent is water.

4. A fungus resistant paint as set forth in claim 1 wherein the trans-1,2-bis(n-propylsulfonyl) ethylene is present therein in an amount from about 0.3% to about 2% by weight of the paint.

5. A fungus resistant paint as set forth in claim 1 wherein the trans-1,2-bis(n-propylsulfonyl) ethylene is present therein in an amount from about 0.5% to about 1% by weight of the paint.

References Cited by the Examiner

UNITED STATES PATENTS 2,789,060   4/57   Spangenburg et al. _____ 106—15

FOREIGN PATENTS 819,069   8/59   Great Britain.

ALEXANDER H. BRODMERKEL, *Primary Examiner.*

JOHN H. MACK, MORRIS LIEBMAN, *Examiners.*